March 16, 1965 A. W. CLOSSON, JR 3,173,825
PARTIALLY VULCANIZED UPPER STIFFENING BLANK
Filed Dec. 6, 1961

INVENTOR.
ADDISON W. CLOSSON, JR.
BY

United States Patent Office 3,173,825
Patented Mar. 16, 1965

3,173,825
PARTIALLY VULCANIZED UPPER STIFFENING BLANK
Addison W. Closson, Jr., Cambridge, Mass., assignor to Beckwith-Arden Inc., Watertown, Mass., a corporation of New Hampshire
Filed Dec. 6, 1961, Ser. No. 157,383
1 Claim. (Cl. 161—156)

This invention comprises a new and improved stiffening blank for use in forming in shoe uppers box toes or counters of high strength, long life and unusual resiliency or bounce.

The invention is based on the discovery that at least two plies of sheet fabric, saturated with a rubber compound, which is at least partially vulcanized and permanently bonded together in laminated formation by their rubber saturant, produce a blank having unexpected and unpredictable advantages in the shoemaking industry.

In the production of shoes of many types it is desired to form a box toe that is resilient and self conforming rather than one that must have sufficient stiffness and rigidity to retain its shape. By "self conforming" is meant the property of instantly resuming normal shape after being temporarily distorted. For example, a satisfactory self conforming box toe, such as is contemplated by this invention, must be capable of bouncing back to its normal shape after being depressed or flattened several thousand times while under test. The multi-ply laminated construction of the blank herein disclosed meets this requirement to a highly unexpected degree.

Another advantage of the novel blank of this invention is that it lends itself with particular facility to the marginal skiving operation required in order to blend smoothly the edges of the blank into the other integuments of the upper. Just why this is so is hard to explain, but the facts are that the present two-ply laminated blank containing a substantial component of vulcanized rubber is easier for the skiving operator to handle than a single ply saturated blank or a blank in which all or most of the saturant is unvulcanized.

Another advantage of the present two-ply blank is that it produces in the finished box side walls of good body and so supplies superior support to the upper and to the dome of the box toe.

The vulcanized component of the present two-ply blank is of further advantage in that it imparts to the blank an elasticity that permits it to respond and accommodates itself to the movement of the upper in side lasting operation.

These and other features of the invention will be best understood and appreciated from the following description of a preferred embodiment thereof, selected for purposes of illustration and shown in the accompanying drawings in which—

Figure 1:
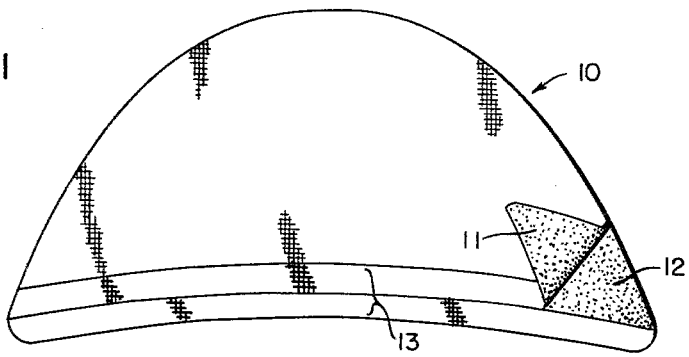
Figure 2:
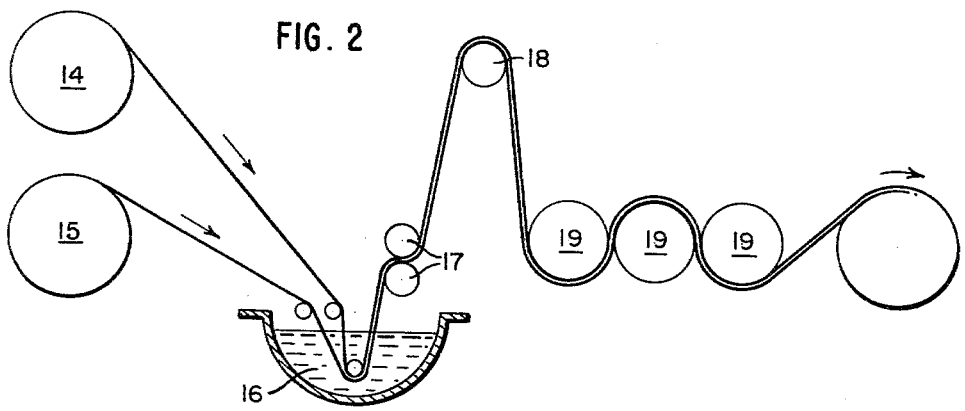

FIG. 1 is a plan view of a skived box toe blank, and
FIG. 2 is a diagrammatic view of apparatus employed in assembling and saturating the sheet material of the blank.

The box toe stiffener blank 10 as shown in FIG. 1 consists of two similar plies 11 and 12 of base fabric, saturated with a partially cured rubber compound and bonded together in face to face contact by their rubber saturant. The blank has a skived zone 13 extending along its rear edge. The ply 11 is shown as separated at one corner and turned back but this would be difficult to do in the actual blank because of the high tenacity of the bonding rubber compound.

The base material of the plies 11 and 12 may be napped or un-napped woven textile, carded felt or paper composition. One entirely satisfactory material is napped flannel having a yard per pound ratio of 3.90-3.00. Both plies may be of the same material and weight or they may be of different base materials as dictated by current industrial conditions.

In preparing the stiffening material the first step consists in saturating both plies 11 and 12 with a rubber compound which is at least 25% and preferably 30% vulcanized, the balance of the rubber being unvulcanized. This saturant may be formed from natural rubber or a synthetic rubber. A typical and satisfactory formula employing natural rubber is as follows:

| | Parts by weight |
|---|---|
| Crude rubber (smoked sheet) | 100 |
| Vulcanized vegetable oil | 10 |
| Stearic acid | 1 |
| Sulphur | 3.5 |
| Zinc oxide | 5 |
| Calcium carbonate | 90 |
| Titanium dioxide | 15 |
| Antioxidant | 1 |
| | 225.5 |
| Petroleum naphtha | 200 |
| Denatured alcohol | 6 |

A satisfactory formula employing synthetic rubber is as follows:

| | Parts by weight |
|---|---|
| Synthetic butadiene (acrylonitrile elastomer) | 100 |
| Zinc oxide | 10 |
| Sulphur | 3.5 |
| Styrene-butadiene copolymer | 35 |
| Calcium carbonate | 70 |
| Stearic acid | 1 |
| High melting synthetic wax | 4 |
| Titanium dioxide | 15 |
| Antioxidant | 1 |
| | 239.5 |
| Toluol | 280 |

It will be noted that both formulas include sulphur and other vulcanizing agents and it is essential to the success of the product that these compositions shall exist in the blank as saturants of the base plies in partially vulcanized state as above specified.

The saturating step may be carried out in such apparatus as that indicated in FIG. 2 wherein a flannel web is drawn from each of two reels 14 and 15 and directed by guide rolls to pass through a bath 16 of the homogeneous liquid rubber solution. The two webs enter the rubber solution separately and are then brought together and passed about a roll immersed in the liquid. They then pass upwardly to squeeze rolls 17 which strip excess solution from the webs and press them into bonding engagement. From the squeeze rolls 17 the composite web is festooned over an overhead roll 18 and then directed to a series of drying drums 19, emerging as a dry flexible sheet product that may be conveniently stored, transported and cut into blanks of the desired shape.

The blank 10 shown in FIG. 1 is now ready to be incorporated into the upper of a lined or unlined shoe and in this condition may be handled by the operator as conveniently as a piece of dry flexible cloth fabric. In order to convert the partially vulcanized rubber saturant to fully vulcanized and resilient condition the blank, preparatory to insertion in the upper, is dipped or coated with a rubber cement containing curing accelerators effective at room temperatures. The wetted and now tacky blank is thus held in position in the upper and conformed in the upper to the shape of the last in the ensuing pulling over and lasting operations. As the cement dries out complete vulcanization of the rubber saturant takes place while the cement sets and securely bonds the conformed stiffening blank in place in the shoe upper.

Suitable accelerating cements for purposes of the present invention are typified by the following formulae:

| | Parts by weight |
|---|---|
| Natural latex (60% solids) | 167.0 |
| Potassium hydroxide | 0.5 |
| Water-dispersible vulcanizing accelerator (a dithiocarbamate) | 30.0 |
| Water | 65.0 |
| | 262.5 |

| | |
|---|---|
| Crude rubber (smoked sheet) | 50 |
| Naphtha | 215 |
| Butyl alcohol | 6 |
| Vulcanizing accelerator (a dithiocarbamate containing a slow evaporating liquid; a brown liquid miscible with naphtha and toluene cements) | 25 |
| | 296 |

The saturating compound of the webs from the two reels 14 and 15 is brought up to the desired degree of vulcanization by the passing of the webs over and about the hot drying drums 19 in association with a measured amount of accelerator, such as dithiocarbamate.

The percentage of vulcanization may be readily determined by standard procedure. See, for example, "Vulcanization Co-Efficient" page 557, "Principles of High Polymer Theory and Practice," McGraw-Hill, 1948.

While two plies are entirely satisfactory as a general thing it would be within the scope of the invention to employ three or more plies in case a heavier box is desired.

The action of the accelerating cement is to convert at room temperature the already partially vulcanized rubber saturant into its fully vulcanized condition thus imparting to the blank and the adjacent upper the desired characteristics of stiffness and resiliency.

Having thus disclosed my invention and described in detail an illustrative embodiment thereof, I claim as new and desire to secure by Letters Patent:

A prepared stiffening blank for shoe uppers, comprising at least two plies of sheet fabric impregnated with an homogeneous compound including a rubber component which is approximately 25 to 30% vulcanized and the balance unvulcanized, together with a vulcanizing component, the said impregnated plies being permanently bonded together in face-to-face contact by their impregnating compound, the blank being flexible and elastic by reason of the vulcanized component of its impregnant and conveniently adapted for marginal skiving and for further vulcanization at room temperature when contacted with an accelerating cement and incorporated in a lasted shoe upper.

References Cited by the Examiner
UNITED STATES PATENTS

| | | | |
|---|---|---|---|
| 1,211,351 | 1/17 | Price | 156—110 |
| 1,911,841 | 5/33 | Miller | 161—240 |
| 2,008,861 | 7/35 | Gray et al. | 260—729 |
| 2,996,099 | 8/61 | McCall | 156—135 |
| 3,069,305 | 12/62 | Fahrbach et al. | 161—156 XR |

EARL M. BERGERT, *Primary Examiner.*
ALEXANDER WYMAN, *Examiner.*